(12) United States Patent
Carneiro

(10) Patent No.: US 10,509,179 B2
(45) Date of Patent: Dec. 17, 2019

(54) CONNECTOR FOR SINGLE OPTIC FIBER CABLE AND CRIMPING TOOL FOR SINGLE OPTIC FIBER CABLE

(71) Applicant: FURUKAWA ELECTRIC LATAM S.A., Curitiba (BR)

(72) Inventor: Matheus Kulcheski Carneiro, Curitiba (BR)

(73) Assignee: FURUKAWA ELECTRIC LATAM S.A., Curitiba, Parana (BR)

( * ) Notice: Subject to any disclaimer, the term of this patent is extended or adjusted under 35 U.S.C. 154(b) by 0 days.

(21) Appl. No.: 15/873,146

(22) Filed: Jan. 17, 2018

(65) Prior Publication Data

US 2018/0203192 A1 Jul. 19, 2018

(30) Foreign Application Priority Data

Jan. 17, 2017 (BR) .......................... 10 2017 000982

(51) Int. Cl.
*G02B 6/36* (2006.01)
*G02B 6/38* (2006.01)

(52) U.S. Cl.
CPC ......... *G02B 6/3887* (2013.01); *G02B 6/3869* (2013.01); *G02B 6/3893* (2013.01)

(58) Field of Classification Search
CPC ... G02B 6/3887; G02B 6/3869; G02B 6/3893
See application file for complete search history.

(56) References Cited

U.S. PATENT DOCUMENTS

| | | | | |
|---|---|---|---|---|
| 5,214,732 A | * | 5/1993 | Beard ................. | G02B 6/3887 385/78 |
| 7,113,679 B2 | * | 9/2006 | Melton ............... | G02B 6/3849 385/103 |
| 9,239,441 B2 | * | 1/2016 | Melton ............... | G02B 6/3887 |
| 9,678,286 B2 | * | 6/2017 | Valencia ............. | G02B 6/3883 |
| 2007/0211997 A1 | * | 9/2007 | Saito .................... | G02B 6/3846 385/60 |
| 2008/0310797 A1 | * | 12/2008 | Yazaki ................ | G02B 6/3806 385/78 |
| 2009/0269011 A1 | * | 10/2009 | Scadden ............. | G02B 6/3817 385/65 |

(Continued)

FOREIGN PATENT DOCUMENTS

BR 102014016480-4 7/2014
WO WO-2013/129485 9/2013

*Primary Examiner* — Ellen E Kim
(74) *Attorney, Agent, or Firm* — B. Aaron Schulman, Esq.; Stites & Harbison, PLLC

(57) ABSTRACT

Connector (C) comprises: an anchoring element (30) involving a latch (20); a semi-tubular clamp (40), having a front end portion (41), inserted and locked in the anchoring element (30), and by a back end portion (42) internally provided with inner teeth (43), between which a cable cover (CC) extension of a single fiber optical cable (1) is inserted and locked, by interference; a tubular housing (50) involving the anchoring element (30) and clamp (40). The clamp's (40) inner teeth (43) are radially protruding inwards, from the internal surface of the clamp's (40) back end portion, to end, each of them, in a cutting edge (43a) contained in plane orthogonal to the clamp's (40) geometric axis and anterior to the cross section of the respective inner tooth (43).

15 Claims, 5 Drawing Sheets

(56) References Cited

U.S. PATENT DOCUMENTS

| | | | |
|---|---|---|---|
| 2011/0044588 A1* | 2/2011 | Larson | G02B 6/3846 385/81 |
| 2011/0052131 A1* | 3/2011 | Park | G02B 6/3806 385/135 |
| 2012/0106899 A1* | 5/2012 | Choi | G02B 6/3887 385/81 |
| 2012/0288238 A1* | 11/2012 | Park | G02B 6/3823 385/80 |
| 2012/0328248 A1* | 12/2012 | Larson | G02B 6/3887 385/81 |
| 2016/0011378 A1* | 1/2016 | Yamaguchi | G02B 6/3802 65/407 |
| 2016/0116684 A1* | 4/2016 | Zhang | G02B 6/3861 385/78 |
| 2016/0139341 A1* | 5/2016 | Morioka | G02B 6/3802 385/69 |

* cited by examiner

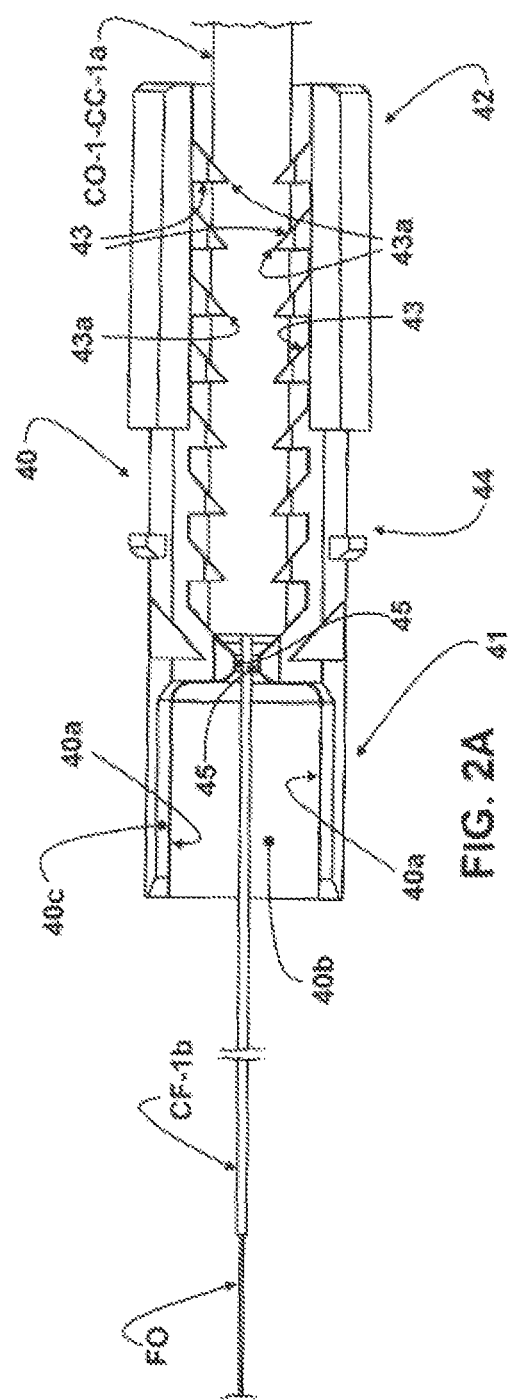

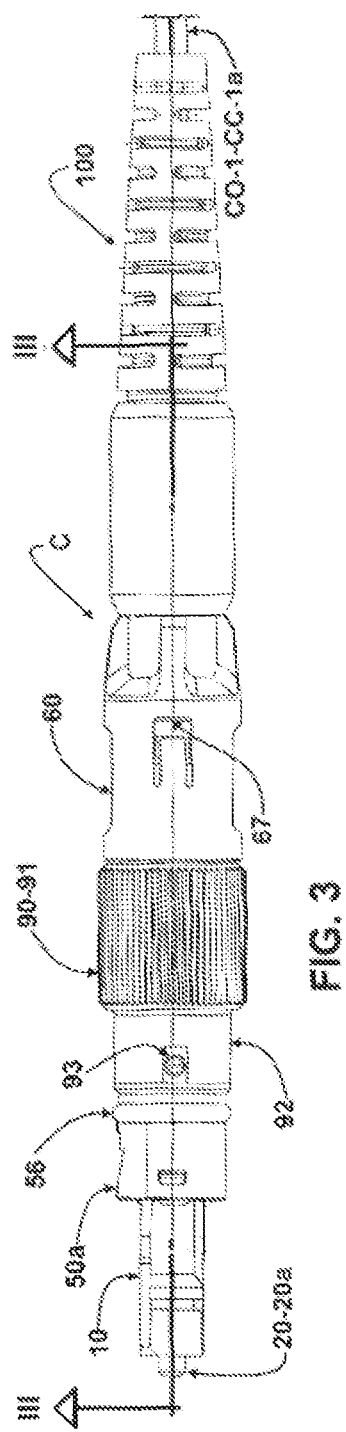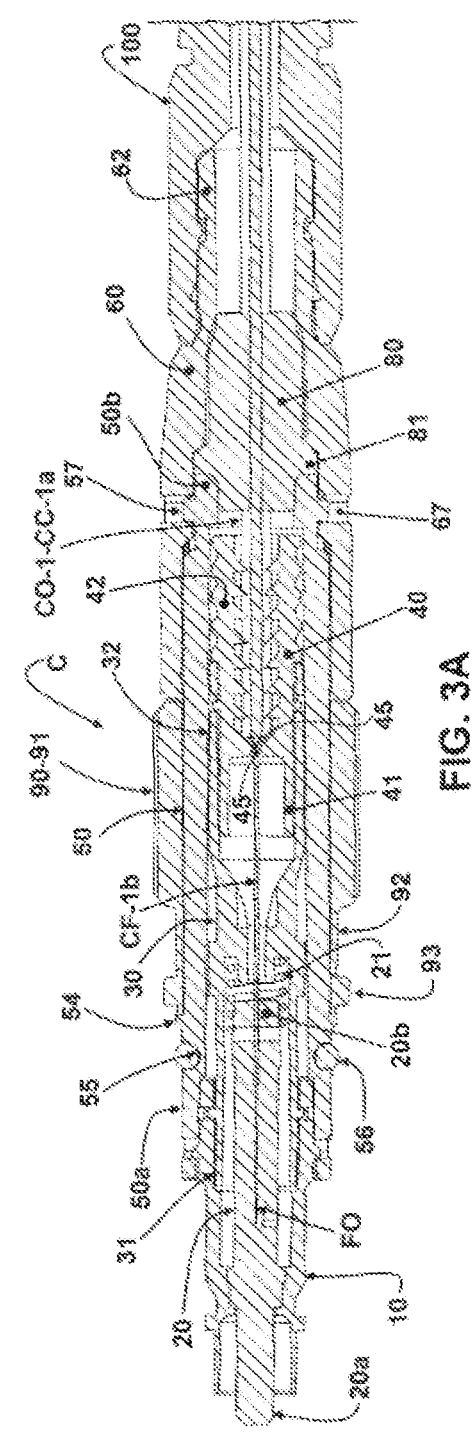

CONNECTOR FOR SINGLE OPTIC FIBER CABLE AND CRIMPING TOOL FOR SINGLE OPTIC FIBER CABLE

FIELD OF INVENTION

This invention refers to a connector for optical fiber cable presenting a basic construction appropriate for a single optical fiber cable, generally known as "low friction" cable, and sufficiently robust and watertight for easy and simple application in different installation conditions, generally in the field, on which the use of assembly tool is generally difficult and even impractical.

The invention further refers to a clamp for single optical fiber cable, in order to lock the referred optical cable to a connector.

BACKGROUND OF THE INVENTION

A type of connector used to connect a single optical fiber cable (optical cable) with a plug-outlet attached to an external terminal box door, with multiple doors, installed on an aerial or underground fashion, being the optical fibers of a network to be accessed by different users by means of the referred optical cables comprising a single optical fiber connected to the referred plug-outlets, is well-known in the art.

In the concerned type of external application, the terminal box plug-outlets and the individual cable connectors must be designed to support stringent temperature, humidity conditions, exposure to chemical agents and other adverse operational conditionals, generally present in an external installation, exposed to bad weather conditions.

The connectors are usual and previously attached to the end of a respective access optical cable, generally by using specific tools, so as to allow the respective optical fiber to be connected to one of the network optical fibers, by simply fitting the connector to a terminal box plug-outlet.

A known type of connector is described in patent application BR 10 2014 016480 4, by the same applicant, comprising: an inner, tubular, body, having a rear end, anchoring an optical cable end, and a front end to which a connecting latch is coupled to a terminal box plug-outlet; a tubular housing involving and locking the inner body; an anchoring means defined by a crimping tube, intended to anchor the optical cable cover and traction elements to the inner body.

In this type of connector, the crimping tube involves an extension of the traction elements arranged over one part of the inner body, to be crimped, in at least to regions axially distant between each other and, along with the confronting portion of the traction elements, to the interior of an external circumferential recess of the inner body and to enter the external cover of the optical cable, anchoring both the cover and the traction elements to the connector's inner body.

The connector described above requires the provision of the crimping tube and, consequently, of specific tools to perform the referred crimping operation, making the assembly of such connector to the end of an optical cable in the field difficult and even unfeasible.

In addition to the limitation mentioned above and related to the requirement for assembly tools installed at specific places, such known connector also requires the provision of equipment in order to guarantee the correct introduction of the bare optical fiber, protruding from the end of the tube cover, inside the tubular inner body and further fitting and locking the bare optical fiber inside the connector latch, preventing eventual transmission continuity solutions between the optical fiber and the latch and, further, risks of damages in the operation of assembling the optical fiber in the connector.

Another construction known and referring to a connector for optical fiber cable is described in document WO2013/129485. In this second construction, the connector also comprises an internal, tubular body, having a front end to which a connecting latch is coupled to a plug-outlet of a terminal box and a back end to which a clamp provided with inner teeth and designed to receive and lock the end of a single optical fiber cable cover, "low friction" type, to be adapted to the connector, is inserted and locked. Finishing and external closing elements are usually provided around the connector's inner body.

In these field connectors, the inner body is provided with means to direct the bare optical fiber extension, protruding from the end of the cable cover, to its subsequent insertion and locking inside the connector's latch, being such operation conducted on a manual basis by the operator without requiring special tools. The inner body further presents an inspection window allowing the operator to follow the oriented movement of the bare optical fiber inside the inner body, towards the interior part of the latch, upon insertion and locking the clamp inside the back end of the inner body.

In this previous construction, the fiber cover, defined by the acrylate coating, (protective cover of the individual optical fiber) is arranged over the interior of the inner body without locking with respect to the latest, being the only locking between the optical cable and the inner body conducted by locking the cable cover into the clamp and by locking the latest inside the back end of the connector's inner body. In this construction, the set defined by the bare optical fiber and by its fiber cover (acrylate coating) is only oriented inside the inner body, even after the bare optical fiber has been inserted and locked into the latch. It must be noted that in this type of "low friction" cable, the pair of traction cables is cut in the end of the cable cover, being that such traction cables do not have any function in locking the optical cable to the connector.

In this second connector of the previous art, no traction cable locking is expected with respect to the connector's inner body, being evident that its project is exclusively intended for the assembly in "low friction" type cables submitted to relatively reduced tensile strengths, allowing the connector's optical cable locking to be exclusively guaranteed by locking the cable cover in the clamp's internal teeth, without locking the traction cables to the connector's body.

Thus, in this known solution of connector for "low friction" optical cable, the locking of the cable cover exclusively depends, before sealing the final connector, on the efficiency of the clamp's internal teeth locking capacity in the cable cover.

Although the second construction described in document WO2013/129485 allows assembling the connector in the "low friction" optical cable end in the field, without using special tools, it has an inconvenience of having the clamp's internal teeth exclusively provided in the inner sides of the latest and presenting, each one, an isosceles triangle cross-section, unable to increase its locking capacity in the cable cover, when the optical cable is submitted to tensile strength in the sense of removing it from the connector. The locking degree obtained by such teeth decreases its efficiency in the axial locking of the single optical fiber's "low friction" optical cable, limiting its use to installations on which the cable is submitted to relatively reduced tensile strengths.

SUMMARY OF THE INVENTION

Considering the state-of-the-art's connectors deficiency, the invention now has the generic objective of promoting a connector for single optical fiber cables, subject to different tensile conditions, to be assembled, in the field, without requiring special tools to guarantee a substantial locking of the cable to the connector and, further, a safe assembly of the bare optical fiber to the connector's latch.

On a more specific way, the invention provides a connector and a clamp to be used in compact optical cables, of single fiber, low-friction type and cross-section generally rectangular and of reduced contour, without requiring any construction change to the inner body, the latch and the tubular housing.

These and other objectives of this invention are reached from a connector for single optical fiber cable comprising: a cable cover, a fiber cover and an optical fiber, the connector being of a type comprising: a tubular anchoring element, having a front end, fixing a latch and a back end; a semi-tubular clamp, having a front end portion, inserted and locked in the back end of the anchoring element, and a back end portion internally provided with inner teeth, between which an extension of the cable cover is radially inserted and axially locked; a tubular housing involving the anchoring element and the clamp and having an front end lodging the latch, and a back end on which a cap is locked. According to the invention, the clamp's inner teeth are radially protruding inwards, from the internal surface of the back end portion of the clamp, to end, each one, in a cutting edge contained in a plane orthogonal to the geometric axis of the clamp and anterior to the cross-section of the respective inner tooth.

BRIEF DESCRIPTION OF THE DRAWINGS

The invention will be described below based on the attached drawings, presented by way of example of possible achievements of the invention, and on which:

FIG. 2A represents a top view of the elements of FIG. 2, with the terminal extension of the "low friction" type optical cable already inserted and locked in the clamp.

FIG. 3 represents a plan view of the optical connection in the condition assembled to the end of a "low friction" type optical cable and turned 90° compared to the one illustrated in FIG. 1.

FIG. 3A is a longitudinal view of the connector of FIG. 3, taken according to line III-III.

DESCRIPTION OF THE INVENTION

Figure 1:
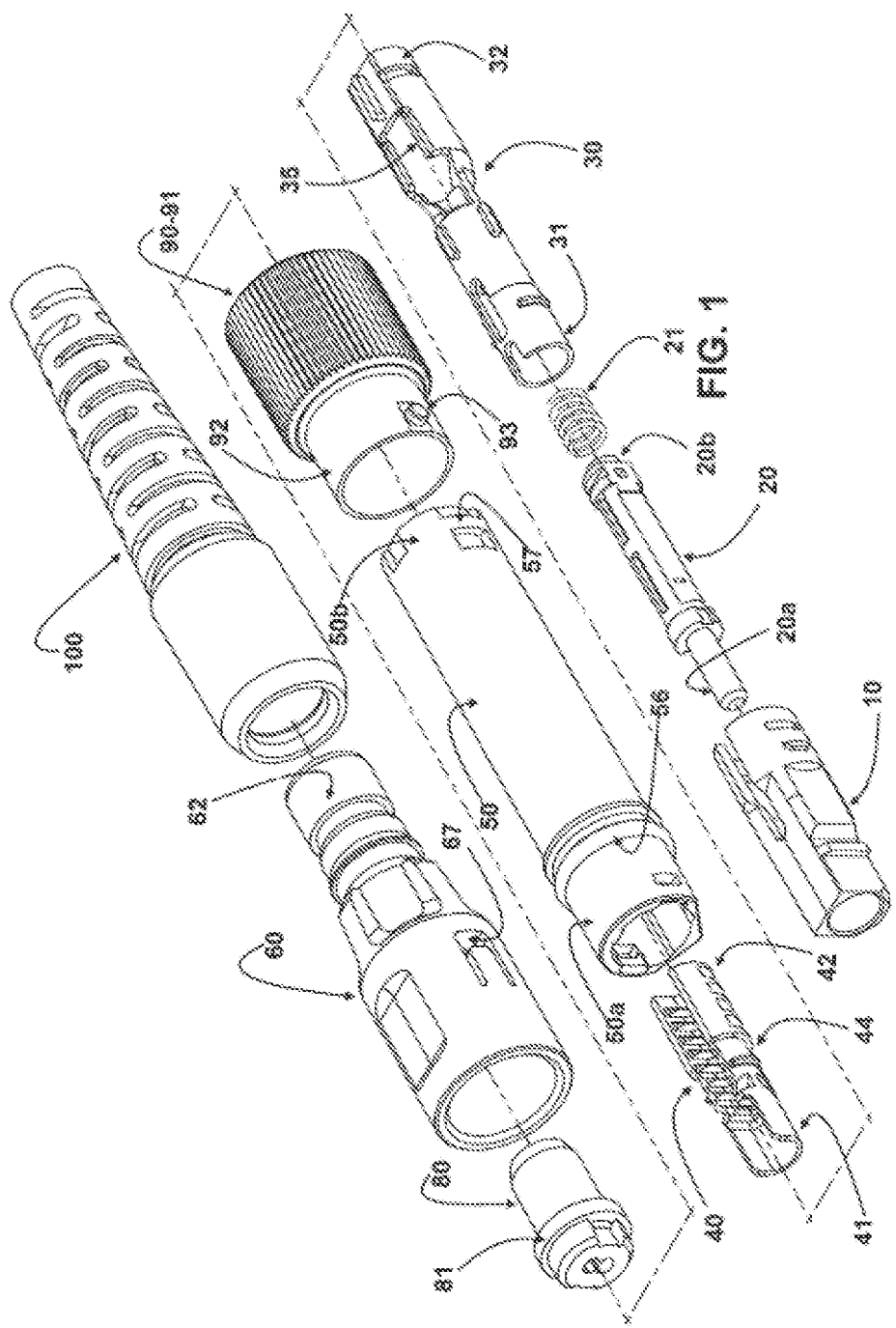
FIG. 1 represents an exploded perspective view of the concerned optical connector, illustrating a possible construction of clamp, to be applied to a "low friction" type single optical fiber cable.
Figure 2:
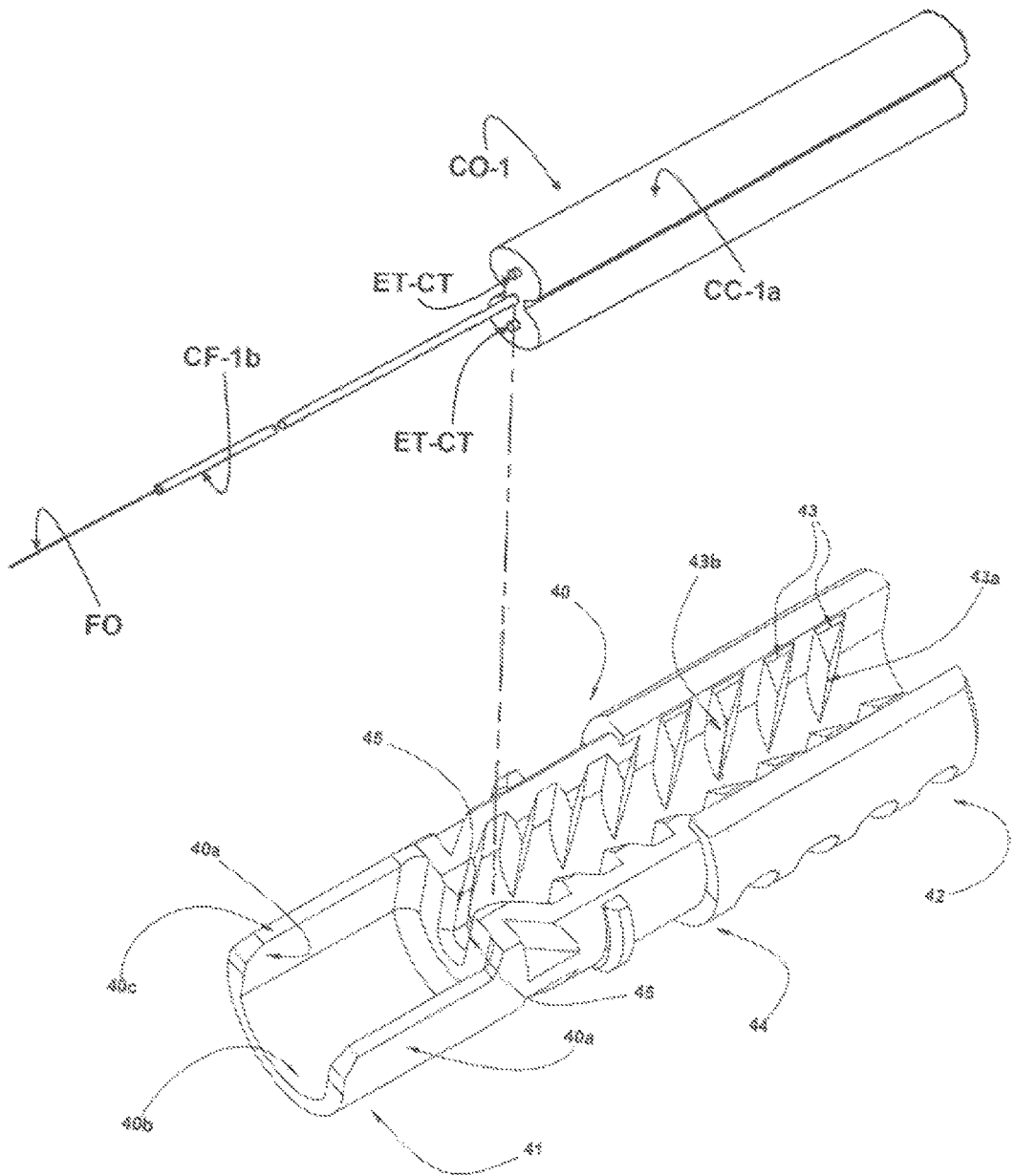
FIG. 2 represents an exploded perspective view of a terminal extension of "low friction" type optical cable and a respective clamp.
Figure 4:
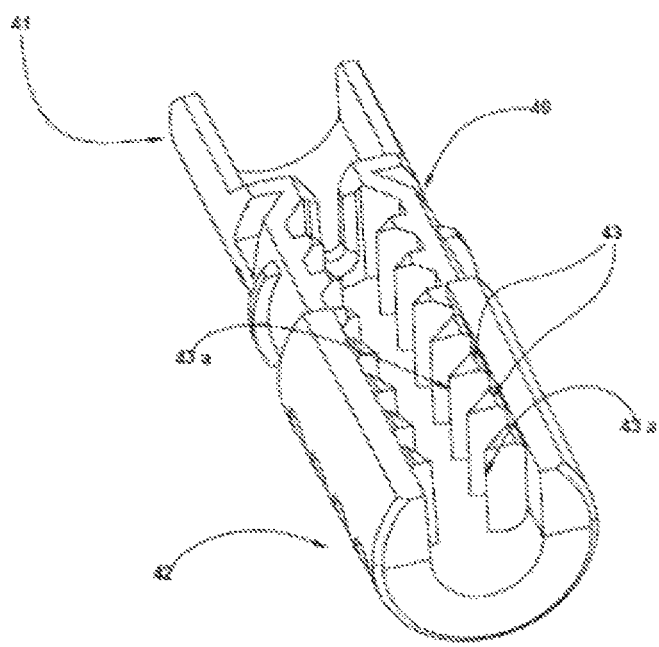
FIG. 4 is a rear end perspective view of the clamp illustrated in FIG. 2.

As illustrated in the attached drawings, the concerned connector is constructed to receive and lock the terminal portion of an optical cable CO defined by a single optical fiber cable 1, "low friction" type having a cable cover CC defined by an external cover 1a, generally in polymeric material, a pair of traction elements ET, in the form of side and opposite traction cables CT, made of metallic material, a fiber cover CF, defining a tight cover 1b, generally made of acrylate and defining a coating involving an optical fiber FO.

The concerned connector basically comprises a tubular plug 10, generally made of plastic material, defining a terminal part configured according to TIA-604-3-B standard, to be connected to an outlet (not illustrated), generally assembled and locked by means of a terminal box wall, to receive and lock, on a simple, safe and watertight way, the connector, according to the arrangement well known in the art.

Inside plug 10, a latch 20 is axially assembled having a front end 20a slightly protruding outside plug 10 and a back end 20b arranged, by means of a rubber band 21, generally in the form of a helical spring, inside an anchoring element 30, tubular, having a front end 31 involving the latch 20 and around which plug 10 is inserted and locked, by means of any know construction. The anchoring element 30 has a back end 32 on which a front end portion 41 of a clamp 40, semi-tubular, having side walls 40a, a back wall 40b and a top opening 40c, extending along the referred front end portion 41, is inserted and axially locked. The clamp 40 further has a back end portion 42, internally provided with inner teeth 43 between which an extension of cable cover CC, defined by the external cover 1a of optical cable 1 ("low friction"), is radially inserted and axially locked, by interference.

The concerned connector further comprises a tubular housing 50, constructed with any appropriate material, whether plastic or metal, involving the anchoring element 30 and the clamp 40 and having a front end 50a involving the latch 20 and a back end 50b on which a cap 60 is locked.

As better illustrated in FIG. 3A, the front end 50a of the tubular housing 50 is designed to be assembled, in an indexed manner and axially locked and well known in the art, around part of plug 10, inside which latch 20 is lodged, constructed, in a known way to receive and lock an extension of the optical fiber FO an a "bare" condition, protruding from the end of the fiber cover CF of optical cable 1, to be assembled in the connector.

The connector further comprises a sealing bushing 80, tubular, positioned between the back end portion 42 of clamp 40 and the cap 60, a coupling device 90 which takes the form of a sleeve 91, with part of its external surface knurled or otherwise grooved, in order to facilitate the manual handling. The sleeve 91 is assemble, on a rotationally free way, around the tubular housing 50, between cap 60, the threaded back end 20b and an external circumferential ridge incorporated into the tubular housing 50. Sleeve 91 presents a front portion 92, with reduced external contour and which incorporates two opposite radial pins 93, to act as bayonet-type coupling elements, for the coupling device 90.

The sealing bushing 80, made of elastomer, guarantees the watertightness in the back region of connector C, presenting a cross-sectional internal contour corresponding to the cross-sectional external contour of optical cable 1. The sealing bushing 80 incorporates a small external peripheral flange 81, radially protruding from the external circular contour and to be axially seated and pressed against the back end 50b of the tubular housing 50.

In addition to guaranteeing an excellent sealing of connector C's back region, the assembly of the sealing bushing 80, radially compressed by cap 60, provides and additional anchoring point of optical cable 1, to tubular housing 50, due to the friction generated by the pressure exercised between the elastomer material of the sealing bushing 80 and the external cover 1a, of optical cable 1 and against the internal surface of cap 60 itself, further preventing the use of the known sealing elements defined by a heat-shrinkable tube.

The tubular housing 50 further incorporates at least one external circumferential groove 55, inside which an O-ring 56, made of elastomer, is housed to be pressed and elastically deformed against a respective confronting inner wall of a terminal box outlet (both not illustrated).

As it can be noted in FIG. 3A, the tubular housing incorporates, in its back end region 50b, two external radial protrusions 57 which are connectable in the respective radial windows 67 of cap 60, allowing the latest to be axial and rotationally locked on the back end 50b of housing 50. This construction allows cap 60, of elongated tubular format, when inserted over the back end 50b of tubular housing 50, involves the sealing bushing 80, compressing it, on a watertight way, radially, against the external cover 1a of optical fiber cable 1, assembled to the connector and, axially, against the back end 50b of tubular housing 50.

The connector can be further provided with a tubular protector 100, generally made or elastomer, coupled on a back end 62 of cap 60 and axially extending, through a certain flexible extension, over a respective part of the optical cable CO, adjacent to the connector.

According to the invention, the inner teeth 43 of clamp 40 are radially protruding inwards, from the internal surface of the back end portion 42 of clamp 40, to end, each one, in a cutting edge 43a contained in a plane orthogonal to the geometric axis of clamp 40 and anterior to the cross section of the respective inner tooth 43.

Each inner tooth 43a of clamp 40 has a front face portion 43b, being that the cutting edge 43a of each inner tooth 43 limits the referred front face portion 43b of the respective inner tooth 43.

In the illustrated configuration, with clamp 40 having a semi-tubular shape, its back end portion 42 presents an internal surface defined by two opposite side parts and by a lower part, each of the referred parts incorporating a respective extension of inner tooth 43.

In the exemplary configuration, each inner tooth 43 of clamp 40 continuously extends by the referred side and lower parts of the internal surface of the referred back end portion 42, maintaining the cutting edge 43a of the respective inner tooth 43 extensions in the same plane orthogonal to the longitudinal axis of clamp 40.

The construction of the inner teeth 43 presented by the invention allows the cutting edges 43a to be induced to penetrate at higher intensity into the cable cover CC, when the optical cable CO is submitted to a tensile strength so as to remove it from connector C. This increased locking capacity characteristic of the inner teeth 43 of this invention results from its conformation on which the cutting edge 43a of each one is located in a plane orthogonal to the clamp axis which does not cut the cross section of the respective inner tooth 43, remaining in front or in the anterior position to the referred cross section, distant or coincident with an adjacent portion of the front face of the referred inner tooth 43.

Still according to the invention, the clamp 40 comprises, in a median region 44, defined between the front 41 and back 42 end portions, a pair of internal guides (45), lateral and mutually confronting, between which an extension of the fiber cover (CF) is radially lodged and guided.

According to the concerned connector application, the extension of the fiber cover CF lodged and guide between the pair if internal guide 45 is defined by an extension of tight cover 1b, defining an optical fiber coating in acrylate, of a "low friction" optical cable 1 provided with a pair of traction elements ET, being the cable cover CC extension, inserted and locked in the inner teeth 43 of clamp 40, defined by an external cover 1a extension of the referred optical cable 1.

The construction of the inner teeth 43 allows a more effective crimping of its cutting edges 43a to the cable cover CC, guaranteeing an axial locking more resistant to higher tensile strengths, without risks of having the cable loose or the application of excessive strengths on the optical fiber.

Being the optical cable 1 fixation to clamp 40 completed, the front end portion 41 of the latest can, then, be inserted and locked in the back end 32 of the anchoring element 30, with the tight cover 1b and with an axial bare optical fiber FO extension protruding from the referred tight cover 1b, being inserted by inside the anchoring element 30 for, then, being inserted and locked inside latch 20.

In order to facilitate the direction of the tight cover 1b, the anchoring element 30 is provided, close to its back end 32, with an inspection window 35, to be aligned with the top opening 40c of clamp 40, when it is inserted and locked in back end 32 of the anchoring element 30, allowing the assembly operator to visualize the direction of the tight cover 1b and the bare optical fiber FO inside the anchoring element 30 until it is inserted into latch 20, an operation which can be facilitated by using disposable guides, not illustrated here, once they're not part of the invention.

The anchoring element 30 is further internally provided, in a median region, in the anterior position with respect to the inspection window 35, with a driving cone, with the larger base directed towards the inspection window and with the lower base directed towards latch 20 and presenting an internal diameter slightly superior than that of the tight cover 1b and in line with the geometric latch 20 axis.

The anchoring system proposed by this invention allows the axial locking of the "low friction" optical cable 1 is conducted with a more intensive locking capacity of the inner teeth 43 and clamp 40 in the external cover 1a of optical cable 1. Such locking represents increased reliability to the fixation of optical cable 1 to the connector, even considering that, in this case, the two traction cables CT do not participate in the axial locking.

Although only one construction for the connector and clamp has been described, it must be understood that changes to the involved components shape can be made without departing from the invention concept defined in the claims which accompany this report.

The invention claimed is:

1. A connector for single optical fiber cable comprising a cable cover which involves traction elements, a fiber cover and an optical fiber, a connector comprising:
   a tubular anchoring element having a front end, involving a bolt and a back end;
   a semi-tubular clamp with side walls, a back wall and a top opening extending by a front end portion of the semi-tubular clamp, inserted and locked in the back end of the tubular anchoring element, and by a back portion of the semi-tubular clamp internally provided with inner teeth, an extension of a cable cover is radially inserted onto the semi-tubular clamp and axially locked, by interference;
   a tubular housing involving the anchoring element and the semi-tubular clamp and having a front end involving the semi-tubular clamp, and a back end on which a cap is locked, a connector being characterized by the fact that the semi-tubular clamp's inner teeth are radially protruding inwards, from an internal surface of the back portion of the semi-tubular clamp, to end, each of them, in a cutting edge contained in a plane orthogonal to the semi-tubular clamp's geometric axis and anterior to the cross section of the respective inner teeth.

2. The connector, according to claim 1, wherein each of the semi-tubular clamp's inner tooth has a front face portion, being that a cutting edge of each of the inner tooth limits the front face portion of each of the inner tooth.

3. The connector, according to claim 1, wherein the back portion of the semi-tubular clamp has its internal surface defined by two opposite side portions and by a lower portion, each of the two opposite side portions and the lower portion incorporating the inner tooth extension.

4. The connector, according to claim 3, wherein each of the semi-tubular clamp's inner tooth continuously extends through a referred side and lower portions of an internal surface of the semi-tubular clamp's back portion, maintaining a cutting edge of the inner tooth extensions in the same plane orthogonal to the semi-tubular clamp's longitudinal axis.

5. The connector, according to claim 4, wherein the semi-tubular clamp comprises, in a median region, defined between the front and back portions, a pair of internal guides, lateral and mutually confronting, an extension of a fiber cover is radially lodged and guided.

6. The connector, according to claim 5, wherein a fiber cover extension lodged and guided between the pair of internal guides is defined by a tight cover extension in the form of an optical fiber coating made of acrylate, of a low friction optical fiber cable provided with a pair of traction elements, being the cable cover extension, inserted and locked in the semi-tubular clamp's inner teeth, defined by an external cover extension of the low friction optical fiber cable.

7. The connector, according to claim 1, wherein a tubular anchoring element is provided with an inspection window to be aligned with the semi-tubular clamp's top opening, in the front end portion, when it is inserted and locked in the back portion of the anchoring tubular element.

8. The connector, according to claim 1, wherein the cap is tubular, elongated, inserted and locked on the back end of the tubular housing, the cap involving a sealing bushing, compressing it, on a watertight way, radially, against a low friction optical fiber cable's external cover and, axially, against the tubular housing's back end.

9. The connector, according to claim 8, wherein the tubular housing incorporates two external radial protrusions while the cap is provided with a pair of radial windows in each of which a respective external radial protrusion of the tubular housing is inserted and locked.

10. A clamp for a single optical fiber cable, constructed and arranged to fix to a connector provided with an anchoring element; wherein the optical fiber cable is of a rectangular section, and has a cable cover, containing traction elements, and a fiber cover involving an optical fiber; the semi-tubular clamp being semi-tubular and having:
   a front end portion constructed and arranged to be inserted and locked in a back end of a tubular anchoring element and a back end portion internally provided with inner teeth, for receiving the cable cover inserted manually and locked, by interference, and anchored through simple fitting
   wherein the inner teeth of the semi-tubular clamp are of triangular prism shape; each of the inner teeth fixed by a rectangular side of the prism to an internal surface of the back end portion of the semi-tubular clamp and are radially protruding inwards, from an internal surface of the back portion of the semi-tubular clamp; and ending in a cutting edge contained in a plan orthogonal to a geometric axis to the semi-tubular clamp and anterior to the cross section of the inner teeth; anchoring the optical fiber cable in the semi-tubular clamp.

11. The clamp, according to claim 10, wherein each of inner teeth of the semi-tubular clamp is profiled as a rectangle triangle prism and has a front face portion, each inner tooth having the cutting edge limiting the front face portion of the inner tooth.

12. The clamp, according to claim 10, wherein the internal surface of the back portion of the semi-tubular clamp is defined by two opposite side portions and by a lower portion, each of the portions incorporating inner teeth extension.

13. The clamp, according to claim 12, wherein each of inner teeth of the semi-tubular clamp continuously extends through the referred side and lower portions of the internal surface of the back portion of the semi-tubular clamp, maintaining the cutting edge of the inner teeth extensions in a plane orthogonal to the longitudinal axis of the semi-tubular clamp.

14. The clamp, according to claim 13, wherein the semi-tubular clamp comprises, in a median region, defined between the front end portion and the back portion, at least a pair of internal guides, lateral and mutually confronting, between which an extension of the fiber cover is radially lodged and guided.

15. The clamp, according to claim 14, wherein an extension of the fiber cover lodged and guided between the pair of internal guides is defined by a tight cover extension in the form of an optical fiber coating made of acrylate of a low friction optical fiber cable provided with a pair of the traction elements, the cable cover extension, inserted and locked in inner teeth, of the semi-tubular clamp defined by an external cover extension of the optical fiber cable.

* * * * *